No. 743,200. PATENTED NOV. 3, 1903.
F. E. SHAW.
POTATO PLANTER.
APPLICATION FILED MAR. 5, 1903.
NO MODEL. 4 SHEETS—SHEET 2.
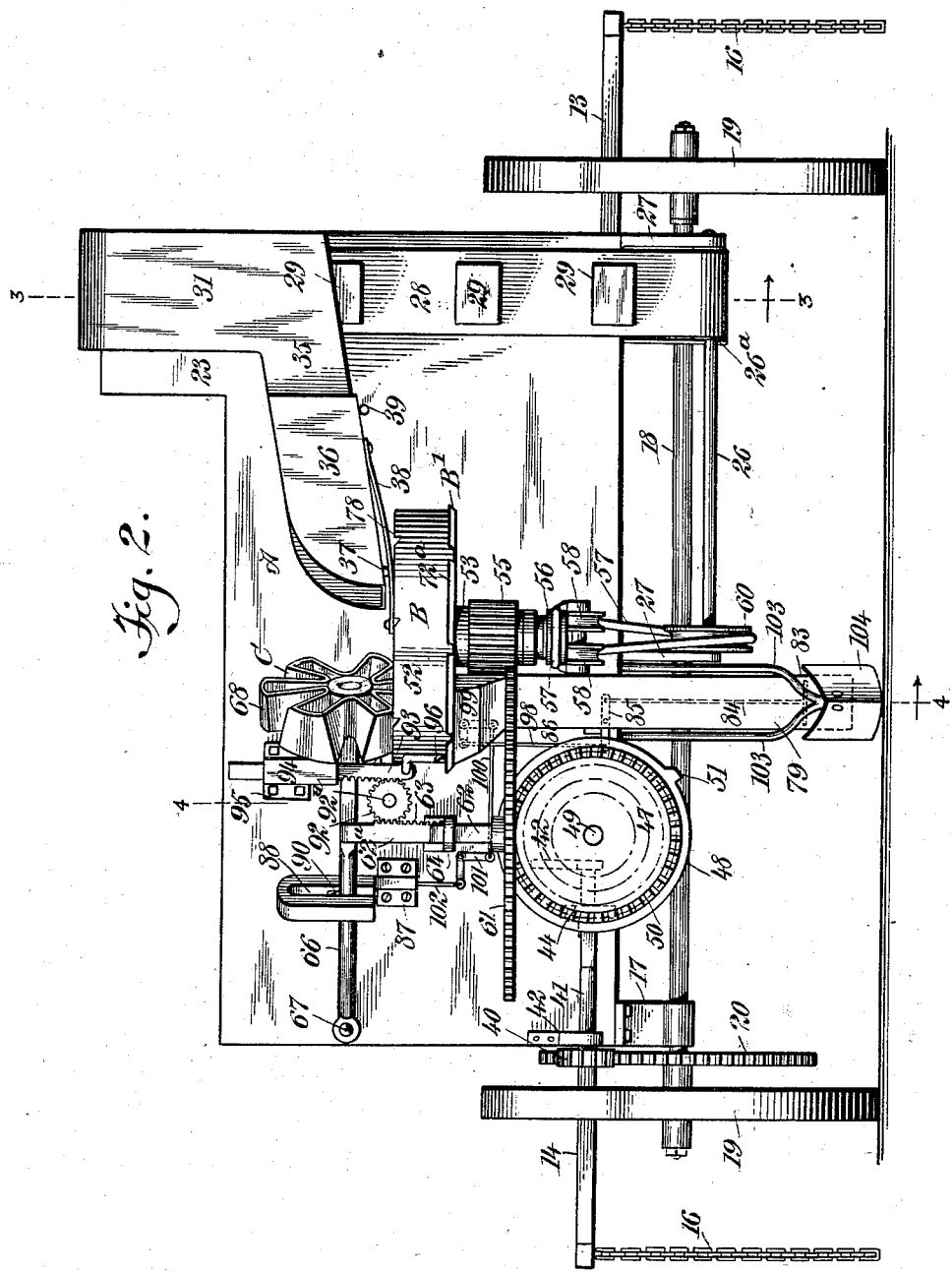
WITNESSES:
INVENTOR
Francis E. Shaw
BY
ATTORNEYS.

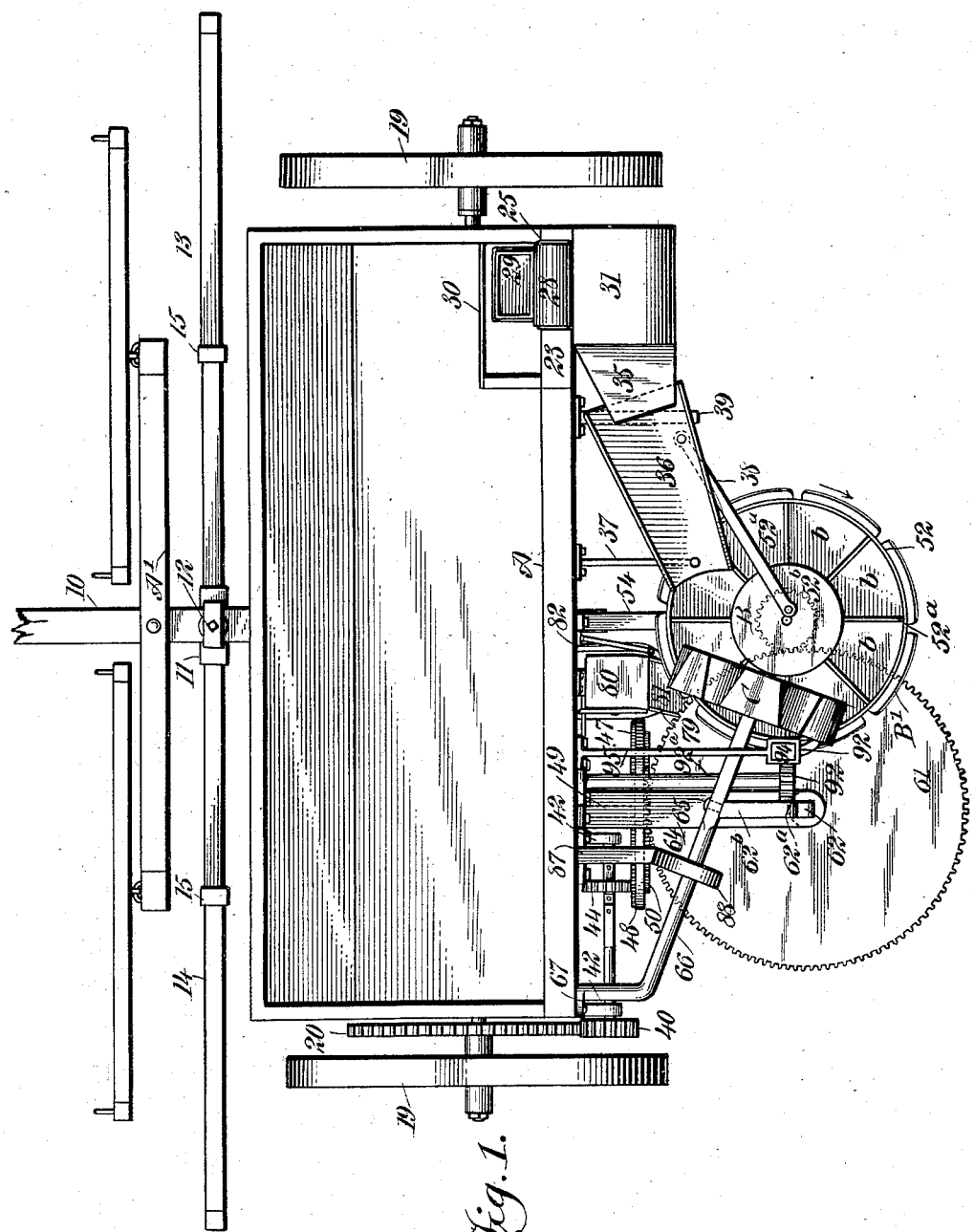

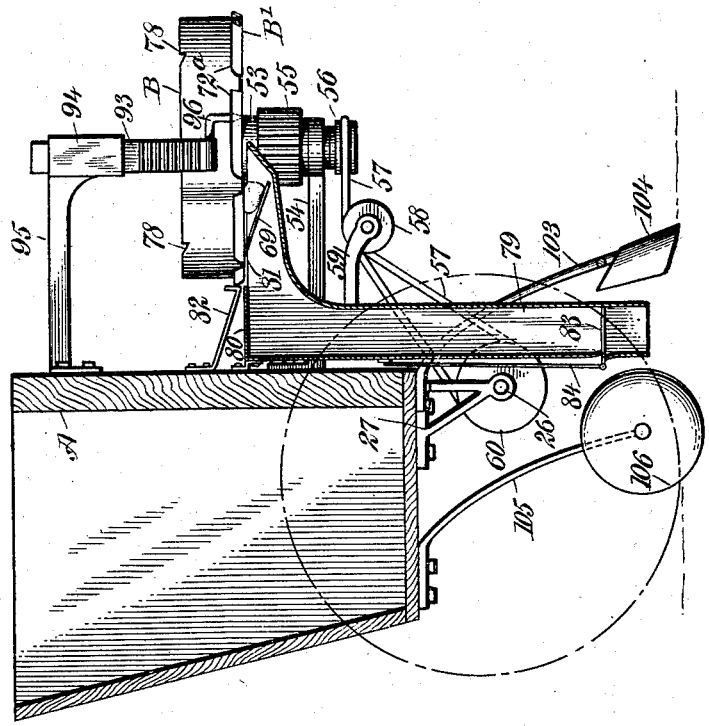

No. 743,200. PATENTED NOV. 3, 1903.
F. E. SHAW.
POTATO PLANTER.
APPLICATION FILED MAR. 5, 1903.
NO MODEL. 4 SHEETS—SHEET 4.
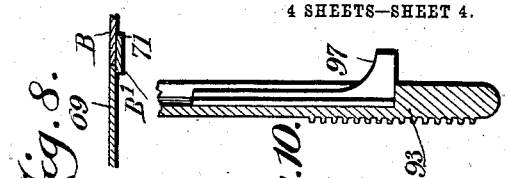
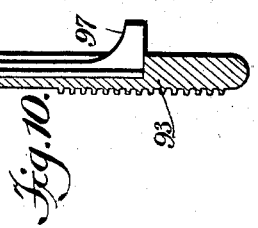
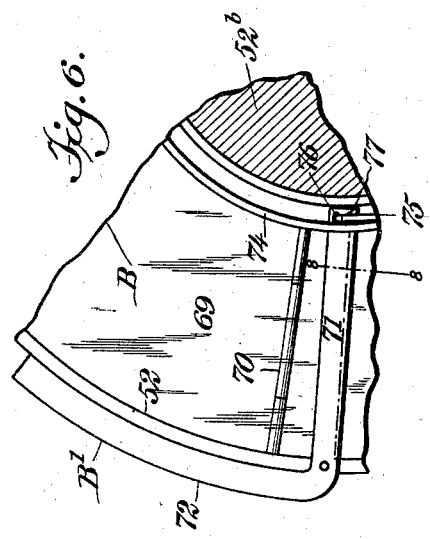
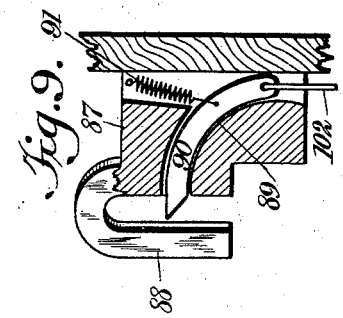
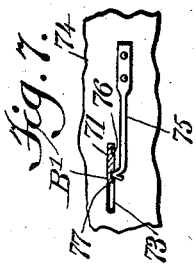
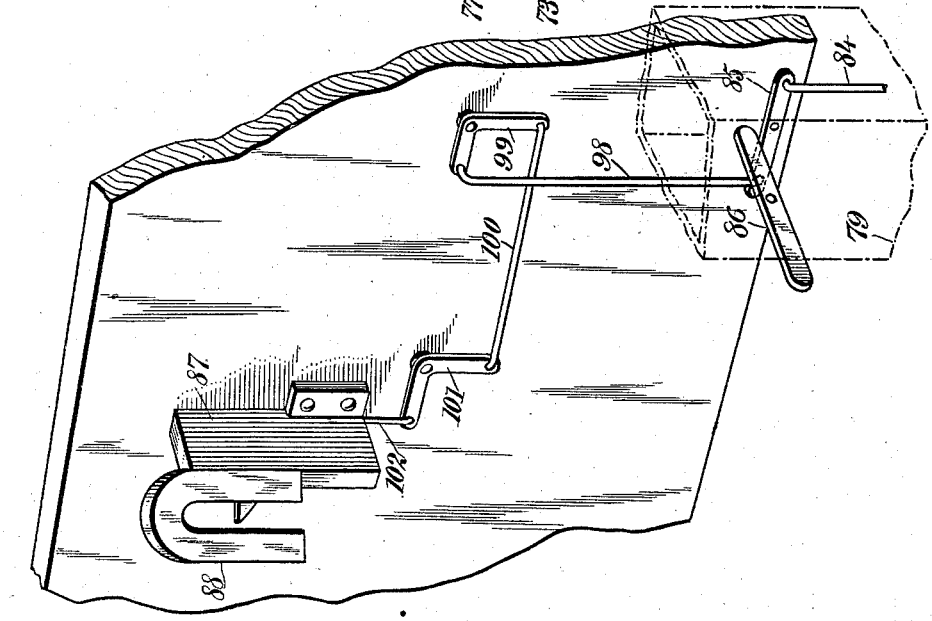
WITNESSES:
INVENTOR
Francis E. Shaw
BY
ATTORNEYS.

No. 743,200. Patented November 3, 1903.

UNITED STATES PATENT OFFICE.

FRANCIS EMERSON SHAW, OF EVART, MICHIGAN.

POTATO-PLANTER.

SPECIFICATION forming part of Letters Patent No. 743,200, dated November 3, 1903.

Application filed March 5, 1903. Serial No. 146,350. (No model.)

*To all whom it may concern:*

Be it known that I, FRANCIS EMERSON SHAW, a citizen of the United States, and a resident of Evart, in the county of Osceola and State of Michigan, have invented a new and Improved Potato-Planter, of which the following is a full, clear, and exact description.

The purpose of my invention is to provide a machine which when supplied with seed-potatoes will automatically drop the seed in suitable quantities at suitable distances apart, whereby to properly space the hills, in connection with which machine a marker of any approved type may or may not be used, and, further, to provide means for automatically opening a furrow and covering the seed dropped into the furrow.

Another purpose of the invention is to construct a machine especially adapted for planting potatoes, which will be as light as possible consistent with strength, effective and reliable in operation, and economical both with respect to the distribution of the seed and from the manufacturer's standpoint.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the machine. Fig. 2 is a rear elevation of the same. Fig. 3 is a transverse vertical section taken practically on the line 3 3 of Fig. 2. Fig. 4 is a central transverse vertical section taken practically on the line 4 4 of Fig. 2, the covering-blade, however, being shown in side elevation. Fig. 5 is a detail perspective view of mechanism for controlling the star-wheel employed in the delivery of the seed. Fig. 6 is a bottom plan view of a portion of the feeding-wheel. Fig. 7 is a detail view of a latch employed in connection with a drop-gate for the feeding-wheel. Fig. 8 is a section through the bottom portion of a part of the feeding-wheel, which section is taken practically on the line 8 8 of Fig. 6, showing one of the drop-gates for the feeding-wheel and its supports. Fig. 9 is a detail sectional view of a portion of the controlling mechanism for the said star-wheel, illustrating particularly the detail construction of the latch. Fig. 10 is a detail sectional view of a portion of the regulating mechanism for the feeding-wheel, and Fig. 11 is a detail sectional view of a support for one of the pinions in the train of gearing employed and a section through the pinion illustrating how said pinion is adjustably mounted.

A represents a hopper of any desired shape and dimensions, and to this hopper a tongue 10 is attached at its central portion provided with any suitable form of draft device A', and at the rear portion of the tongue a suitable sleeve 11 is located, into which a thumb-screw 12 extends, and opposing bars 13 and 14 are passed through the said sleeve 11 one over the other. At the inner end of each of the bars 13 and 14 a guide-sleeve 15 is secured, through which the other bar passes. These bars 13 and 14 carry chains 16 at their outer ends, and these chains are adapted to trail upon the ground and serve practically as markers.

Brackets 17 extend downward from the bottom of the hopper A, and in these brackets 17 an axle 18 is mounted to turn, being provided at each end with a suitable supporting-wheel 19, the said supporting-wheels being adapted to revolve the said axle 18, as a driving-gear 20 is secured to the axle 18, preferably near its left-hand end, as is shown in Figs. 1 and 2.

At the right-hand side of the hopper A in the bottom thereof an opening 21 is produced, and this opening is surrounded by a shield 22, which extends downward from the bottom of the hopper, as is best shown in Fig. 3. This shield is open at its bottom and at its rear.

At the right-hand rear portion of the hopper A an extension 23 is provided, carried above the upper edge of the hopper, and on the top portion of this extension 23 a shaft 24 is journaled in suitable bearings, (shown in Figs. 1 and 3,) and on this shaft a roller 25 is mounted to turn. In vertical alinement with the shaft 24 a second shaft 26 is located below the bottom rear portion of the hopper A, and this shaft 26 is journaled in bearings 27, which extend from the lower portion of the hopper A, as is shown in Figs. 2 and 3. The shaft 26 is quite close to the open rear portion of the aforesaid shield 22, as is shown in Fig. 3, and on the lower shaft 26 opposite the shield 22 a roller 26ª is mounted to turn. An elevator-belt 28 is passed over the upper roller 25 and the lower roller 26ª, as is shown in Figs. 2 and 3, and on this elevator-belt 28 a series of buckets 29 is suitably secured, the buckets being open at the top and so placed on said belt 28 that at the upper stretch of the belt the open ends of the buckets will face uppermost, as is shown in Fig. 3, and will pass up through the opening 21 in the bottom of the hopper A, and consequently through the said hopper. Each bucket 29 is intended to receive a single seed-potato only. These buckets 29 at the upper stretch of the belt pass through the shield 22, and the buckets 29 are so spaced that when one bucket passes through the opening 21 into the hopper A another bucket will have entered the bottom portion of the shield 22, and consequently the seed-potatoes are prevented from dropping out through the aforesaid opening 21 in the hopper.

A box-casing 30 is located at the upper portion of the hopper A at the extension 23 from the rear of the said hopper, and this box-casing 30 is open at the top and at the bottom, so that in the event two seed-potatoes should possibly be lodged in one bucket 29 as the bucket is about to make its return movement around the upper roller 25 the surplus potato will drop out from the bucket and will fall into the hopper A, and thus not be lost.

A hooded extension 31 is provided for the box-casing 30, being usually integral therewith, and this hooded extension 31 is at the rear portion of the back of the hopper, as is shown in Figs. 1, 2, and 3. This hooded extension 31 from the box-casing 30 is provided with an opening 32 in its bottom of sufficient size to permit the downward passage of the buckets 29 on the elevator-belt 28, and adjacent to these openings 32 and constituting the rear wall thereof a vertical partition 33 is located. This partition forms a chamber 34 in the bottom portion of the hooded extension 31, and this chamber is continued in direction of the left-hand side of the machine in the form of a spout 35, as is shown in Figs. 1 and 2. In connection with this spout 35 a chute 36 is employed adapted to conduct the seed-potatoes to a feeding-wheel B as they are dropped into the chamber 34 from the buckets 29. This chute 36 is pivoted near its outlet end on an angular bracket 37 from the rear of the trough A and is provided between its ends with a pitman 38, as is best shown in Figs. 1 and 2, one end of which is pivoted to the back of the chute. The rear portion of the chute is mounted to turn upon and is supported by a horizontal arm 39, which extends outward and rearward from the rear portion of the said hopper.

With reference to the gearing a pinion 40 is made to mesh with the driving-gear 20 on the axle 18, and this pinion 40 is mounted on a shaft 41, horizontally located at the left-hand rear portion of the hopper A, being held to turn in suitable bearings 42. This shaft 41 is rectangular in cross-section for a portion of its length, as is indicated in Figs. 2 and 11, and in the rectangular portion of the said shaft 41, as is shown in Fig. 11, a series of apertures 43 is produced, and on this portion of the shaft a second pinion 44 is adjustably secured. The pinion 44 is preferably attached to the shaft 41, as is shown in Fig. 11, through the medium of an angle-plate 45, secured to one face of the pinion, and a pin 46, which passes through a member of the angle-plate which engages with the shaft and through any one of the apertures 43 in the shaft. This pinion 44 is adapted to coact with a master-gear 48, which is mounted to turn on a shaft 49, extending horizontally from the rear of the hopper A. This master-gear 48 is provided upon its front face with series of circularly-arranged teeth 47, with which teeth the adjustable pinion 44 is adapted to engage, so that by moving the pinion 44 on the shaft 41 to bring the pinion in mesh with an inner or an outer circle of teeth on the master-wheel the master-wheel may be driven at a greater or a less speed almost directly from the axle. This master-wheel 48 is likewise provided at its rear face near its periphery with a series of circularly-arranged teeth 50, as is best shown in Fig. 2, and at one point in the periphery of the said master-wheel 48 a tooth 51 is formed for a purpose to be hereinafter described.

The feeding-wheel B, heretofore referred to, is located at the rear of the hopper at about a point centrally between its ends, as is shown in Figs. 1 and 2. This feeding-wheel B consists of a rim 52, a solid central section $52^b$, and partitions $52^a$, which extend from the solid center to the rim, forming thereby a series of compartments $b$, each of which compartments is adapted to receive a seed-potato from the chute 36, and it may be here remarked that the pitman 38, pivotally attached to the chute 36, is likewise pivoted to the central portion $52^b$ of the said feeding-wheel. Therefore as this feeding-wheel B revolves the chute 36 is given more or less of a lateral reciprocating motion, and the potatoes are consequently made to readily leave the chute and drop into the buckets of the planting-wheel.

The feeding-wheel B is mounted on a vertical shaft 53, held to turn in a suitable horizontal bearing 54, extending from the rear of the hopper A, as is shown in Figs. 1 and 4. A pinion 55 is secured on this shaft 53 below the feeding-wheel B, and at the lower end of the said shaft 53 a horizontal pulley 56 is attached or formed. Around this pulley 56 an endless belt 57 is passed. This endless belt 57 is carried forward and is made to pass over twin guide-pulleys 58, mounted to turn in a suitable bracket 59, also extending from the hopper A, as is particularly shown in Figs. 2 and 4. This belt 57 is then passed over a large pulley 60, which is secured on the shaft 26, carrying the lower roller 26ª of the elevator-belt 28, and in this manner as the feeding-wheel B is revolved the elevator-belt 28 is given proper movement.

Motion is communicated to the feeding-wheel B at necessary intervals through the medium of a large horizontal gear 61, which is movable to and from the rear teeth 50 on the master-wheel 48, and the teeth of this large horizontal gear 61 engage with the pinion 55 on the aforesaid shaft 53, carrying the feeding-wheel. This horizontal gear-wheel 61 is mounted to turn on a support 62, which has guided movement in a bracket 64, extending rearwardly from the hopper A. This support 62 extends vertically upward from the gear 61 through the said bearing 64, and is then carried horizontally forward and upward to form a vertical upper section 62ª, which section 62ª of the said support at its inner or right-hand edge is provided with rack-teeth 61. Finally, the upper portion of the said support 62 is carried horizontally forward, forming an upper horizontal arm-section 62ᵇ, which is pivotally attached to an arm 66, as is shown at 65 in Fig. 1, which arm is pivoted at its left-hand end to the left-hand end portion of the hopper A at its rear, as is shown in Figs. 1 and 2, extending horizontally rearward from its pivot and then horizontally rearwardly and diagonally and in direction of the right-hand end of the said hopper, as is particularly illustrated in Fig. 1. At the inner end of this pivoted arm 66 what I term a "star" or "fluted" wheel C is mounted to turn. This wheel is located over the feeding-wheel B at one side of its center, occupying such a position that the members 68 of the said star or fluted wheel C, as the said feeding-wheel is revolved, will enter one chamber b after the other and will be lifted by the seed-potato in the chamber and at such time stop the revolution of the feeding-wheel, as will be hereinafter more particularly described.

Each chamber b in the feeding-wheel B is provided with a bottom 69, hinged at one edge, as shown at 70 in Fig. 6, which bottoms are adapted to drop to discharge a potato, as is shown in Fig. 4. These bottoms 69 for the chambers b are normally held closed through the medium of angle keeper-bars B'. (Shown best in Fig. 6.) These arms are pivoted at or near the junction of their members to the bottom portion of the rim 52 of the feeding-wheel, and one member 71 of a keeper-arm B' extends along and crosses the junction of the free end of the bottom section 69, where it engages with the solid portion of the feeding-wheel or the knuckle of the next bottom section, as may be found desirable, while the other member 72 of the keeper-arm extends outward and along the outer face of the rim 52 of the feeding-wheel, being provided with an upturned edge 72ª, as is shown best in Fig. 4. Where the said edge 72ª of a keeper-arm is upturned, it is at more or less of an obtuse angle to the bottom portion of the member 72. These edges 72ª are adapted to assist in moving the keeper-arms B' on their pivots, so as to permit any desired bottom 69 to open or drop downward, as is shown in Fig. 4, and the means for bringing about this action will be hereinafter described.

The inner members 71 of the keeper-arms B', or those which actually serve to support the bottoms 69 at their free ends, extend through openings 73, made in a flange 74, formed at the bottom portion of the central or hub portion 52ᵇ of the feeding-wheel, as is shown in Figs. 6 and 7. A spring 75 is provided for each keeper-arm B', the said springs being attached at one end to the inner face of the said flange 74, while at the free end of each spring 75 a head is formed, adapted to enter either one of two recesses 76 77 at the inner ends of the said angular keeper-arms B'. This contact between the spring and the keeper-arms is just sufficient to hold the keeper-arms in their closed position or in their open position against being accidentally moved from either.

In order that the feeding-wheel B may be held in position to discharge a potato, recesses 78 are produced in its upper edge, adapted to be engaged by a suitable keeper, to be described later on.

A conducting tube or spout 79 is attached to the rear of the hopper A, occupying such position that its upper portion will be brought below one of the chambers b in the feeding-wheel—that is, the chamber from which the potato is to be discharged and the chamber over which the star or corrugated wheel C is located. This conducting tube or spout 79 is provided with a closed upper forward portion 80, which is just forward of the feeding-wheel B and with an opening 81 in its top, extending rearward from the closed portion 80 to the extreme rear upper end of the said tube or spout. This opening 81 is of sufficient dimensions to permit the bottom section 69 of the feeding-wheel B to drop, as is shown in Fig. 4, and to permit the seed-potato contained in the chamber to drop into the upper portion of the said tube or spout; but this potato is not permitted to pass down the tube or spout until the drop-bottom 69 has been raised. This is accomplished by the said drop-bottom engaging with the rear edge of the covered upper section 80 of the tube or spout, and when the bottom reaches its full closed position a finger 82, extending from the rear of the hopper, will be brought in engagement with the outer member 72 of the angle keeper-arm B' for the said bottom and will force the said keeper-arm to its closed or locking position relative to the bottom section just operated.

At the bottom portion of the conducting tube or spout 79 a door 83 is pivoted, which normally closes the lower end of the said shoe and holds the seed-potato in position to be dropped to the ground at the proper moment. The seed-potato thus supported is dropped, and the door 83 is closed again until the potato delivered from the chamber in the feeding-wheel B is permitted to drop down to the lower portion of the tube or spout. This drop-door 83 is pivotally connected with an upwardly-extending rod 84, and this rod 84 at its upper end is pivoted to one end of an arm 85, centrally fulcrumed to the back portion of the hopper A. The opposite end of this pivoted arm 85 is adapted to be pressed downward by a trip-arm 86, which extends outward at a right angle from the back of the hopper A and is raised at its outer end by engagement with the peripheral tooth 51 on the master-wheel 48.

At the upper rear portion of the hopper A, between its center and its left-hand end, a bracket 87 is secured, and from this bracket a substantially inverted-U-shaped member 88 is projected. As is shown in Fig. 9, a curved latch-bar 90 is mounted to slide in a curved recess 89 in the said bracket 87, and the outer end of the said latch-bar, which is beveled, is adapted to normally extend into the space between the legs of the U member 88 of the said bracket 87, as is shown in Figs. 2 and 5, being held in this position by a spring 91. (Shown also in Fig. 9.)

When the seed-potato in a chamber $b$ of the feeding-wheel B is brought beneath the star or corrugated wheel C, it will raise the said wheel, and in raising the said star-wheel the arm 66, carrying the star-wheel, will be also elevated and will pass the latch-bar 90, forcing it inward in passing, and after the arm 66 has passed this latch-bar the latch-bar will again assume its normal position and will support the arm 66 in its upper position, holding the star-wheel C out of possible engagement with the feeding-wheel B.

When the arm 66, carrying the star-wheel C, is raised, it carries up with it the support 62 for the large horizontal gear-wheel 61 and takes the gear-wheel 61 out of mesh with the master-wheel 48, which master-wheel continues to travel while the horizontal wheel 61 remains idle, and consequently the feeding-wheel B at that time is not turned. As the arm 62, carrying the large gear 61, is raised to stop the motion of the said gear 61 the keeper-arm B' of the chamber from which the seed-potato is to be discharged is carried outward sufficiently to release the drop-bottom of that chamber, permitting it to fall, as is illustrated in Fig. 4. This is accomplished in the following manner: A small pinion 92 engages with the rack-teeth 63 on the support 62 for the gear-wheel 61, which pinion is mounted on a suitable shaft $92^a$, extending from the rear of the hopper A, and this pinion 92 engages with the teeth of a vertically-disposed rack-bar 93, held to slide in a bearing 94, carried by an arm 95, also extending from the rear of the hopper A, as is shown in both Figs. 1 and 2. This rack-bar 93 is provided at its lower end with a finger 96, extending downwardly and having its lower end beveled, and as the said support 62 travels upward the rack-bar 93 will simultaneously move downward, and the finger 96 coming in engagement with the inclined flange $72^a$ of the keeper-arm B' to be operated upon will move the outer member of the arm sufficiently outward to carry the inner member out of locking engagement with the bottom of the compartment containing the potato to be dropped, whereupon the said bottom will fall, as has been described and as shown in Fig. 4, and when the feeding-wheel is again revolved the dropped bottom will be restored to its closed position in the manner which has been set forth. The said feeding-wheel B is again revolved the moment that the star-wheel C falls, thus bringing the horizontal gear 61 again in mesh with the master-gear 48. While the finger 96 of the rack-bar 93 is acting upon a keeper-arm B' a gravity-pawl 97, held to slide in the rack-bar 93 and shown in Fig. 10, will enter a notch 78 in the upper edge of the feeding-wheel, and thus prevent the feeding-wheel from accidentally turning. The star-wheel C is dropped and the rack 93 and its finger 96 are simultaneously raised at the moment that the tooth 51 on the master-wheel operates the trip-bar 86 through the connection between the latch 90 and the lever 85, on which the said trip-bar operates, which connection is best shown in Fig. 5 and consists of a link 98, pivoted to the said lever 85 at one end and to one end of an elbow-lever 99 at its other end, which elbow-lever is pivoted to the rear of the hopper A. The other member of this elbow-lever 99 is pivotally connected by a link 100 with a member of a second elbow-lever 101, connected by a link 102 with the said latch-bar 90. Thus it will be observed that when the trip-bar 86 acts upon the lever 85 it raises one end and lowers the other, and the elevated end of the lever 85 will open the door 83 in the shoe 79 to discharge a potato. At the same time the depressed end of the lever 85 will draw in the latch-arm 90 and permit the arm 66, carrying the star-wheel C, to drop, bringing the gear 61 in mesh with the master-wheel 48, thus again starting a rotation of the feeding-wheel B, which wheel in turning will have discharged another seed, which will drop down into the bottom of the shoe, as the door 83 will have been closed by the spring 91 the moment the tooth 51 on the master-wheel clears the trip-bar 86, and as the bottom of the chamber is closed from which the seed has just been discharged another chamber with another seed is presented to the star-wheel C, and this wheel is again raised and the operation described is repeated.

At each side of the conducting tube or spout 79 an arm 103 is carried downward and rearward from the bottom of the hopper A, and these arms 103 meet at their lower ends in rear of the tube or spout and serve to support the covering-blade 104, which is at the rear of the tube or spout 79 and extends downward below the same. In front of the tube or spout 79 a furrow-opener 106 is located, which is in the form of a disk, and this disk furrow-opener is mounted to revolve upon a suitable arm 105, also attached to the bottom of the hopper A. The said arm 105 is given a downward and rearward inclination, as is shown in Fig. 4. Thus it will be observed that when a seed-potato has dropped from the conducting tube or spout 79 it falls into a furrow formed by the furrow-opener 106 and is covered with earth by the covering-blade 104 at the rear of the tube or spout.

Having thus described my invention, I claim as new and desire to secure by Letters Patent—

1. In a potato-planter, a movable feeding member having a chamber to receive and discharge a seed-potato, an actuating mechanism for said member, and a make-and-break connection between the feeding member and actuating mechanism, and controlled by the contents of the chamber of the feeding member, as described.

2. In a potato-planter, a rotatable feeding member having a chamber to receive and discharge a seed-potato, an actuating mechanism for said member, a make-and-break connection between the feeding member and the actuating mechanism, said make-and-break connection including a shifting member in juxtaposition with the feeding member receiving the seed-potatoes, said feeding member being adapted to carry the seed-potatoes in contact with the shifting member and the make-and-break mechanism for moving the latter, as described.

3. In potato-planters, a rotatable feeding member, an actuating mechanism for the feeding member, including make-and-break connections, and means for operating the said make-and-break connections by contact with the seed-potatoes carried by the feeding member, as set forth.

4. In potato-planters, a rotatable feeding member provided with chambers, drop-bottoms for the chambers, an actuating mechanism for the feeding member, including a make-and-break connection, means for operating the make-and-break connection by contact with the seed-potatoes carried by the feeding member, and a device for releasing the drop-bottom of a chamber in the feeding member simultaneously with the break between the actuating mechanism and the feeding member, as set forth.

5. In potato-planters, a rotatable feeding member provided with chambers, drop-bottoms for the chambers, an actuating mechanism for the feeding member, including a make-and-break connection, means for operating the make-and-break connection by contact with the seed-potatoes carried by the feeding member, and a device for releasing the drop-bottom of a chamber in the feeding member simultaneously with the break between the actuating mechanism and the feeding-wheel, the said releasing device being operated to releasing position by the said make-and-break connection at the breaking movement of the same, as described.

6. In potato-planters, a rotatable feeding member provided with chambers, drop-bottoms for the chambers, an actuating mechanism for the feeding member, including a make-and-break connection, means for operating the make-and-break connection by contact with the seed-potatoes carried by the feeding member, a locking device for the drop-bottom of the chamber in the feeding member, and a device for releasing the locking device of the drop-bottom from locking engagement therewith, and operated to and from the locking device by the movement of the said make-and-break connection in the actuating mechanism, substantially as described.

7. In potato-planters, a rotatable feeding member provided with chambers, drop-bottoms for the chambers, an actuating mechanism for the feeding member, including a make-and-break connection, means for operating the make-and-break connection by the contact with the seed-potatoes carried by the feeding member, a locking device for the drop-bottom of a chamber in the feeding member, a device for releasing the locking device of the drop-bottom from locking engagement therewith, and operated to and from the locking device by the movement of the said make-and-break connection in the actuating mechanism, a retarding device for the feeding member, carried by the releasing device, and means for automatically supplying seed-potatoes to the said feeding member, as described.

8. In potato-planters, a rotatable feeding member provided with chambers, drop-bottoms for the chambers, an actuating mechanism for the feeding member, including a make-and-break connection, means for operating the make-and-break connection by the contact with the seed-potatoes carried by the feeding member, a locking device for the drop-bottoms of the chambers in the feeding member, a device for releasing the locking device of the drop-bottoms from locking engagement therewith, and operated to and from the locking device by the movement of the said make-and-break connection in the actuating mechanism, a retarding device for the feeding member carried by the releasing device, means for automatically supplying seed-potatoes to the said feeding member, a spout arranged to receive seed from the feeding member, a drop-door in the spout, and means for periodically operating the drop-door by the actuating mechanism for the said feeding member, as specified.

9. In a potato-planter, a feeding-wheel divided into a series of radial chambers, a drop-bottom for each chamber, hinged at one end and free at the other, and an angular keeper-arm for each of the said drop-bottoms, pivotally attached to the rim portion of the wheel at its under portion, one member of each keeper-arm extending over the free end of the drop-bottom, the other member of the keeper-arm extending outward and following the outer portion of the rim of the said wheel, as described.

10. In a potato-planter, a feeding-wheel divided into a series of radial chambers, a drop-bottom for each chamber, hinged at one end and free at the other, an angular keeper-arm for each of the said drop-bottoms, pivotally attached to the rim portion of the wheel at its under portion, one member of each keeper-arm extending over the free end of a drop-bottom, the other member of the keeper-arm extending outward and following the outer portion of the rim of the said wheel, an upwardly-extending flange at the outer portion of the outer member of each keeper-arm, and a latch for each keeper-arm secured at one end to the said wheel at its bottom portion, each latch being provided with a head adapted to enter recesses in the inner ends of the said keeper-arms, as and for the purpose described.

11. In a potato-planter, a master-wheel, means for driving the same, a feeding-wheel provided with radial chambers, and drop-bottoms for the chambers, means for releasing and securing the said drop-bottoms of the chambers, a supporting-shaft for the feeding-wheel, a pinion carried by the said shaft, a drive-gear adapted to mesh with the master-gear and with the pinion on the supporting-shaft of the feeding-wheel, the driving-gear being movable to and from the master-wheel, a pivoted arm connected with the support for the said driving-gear, a star-wheel pivoted at one end of the said arm and adapted to be raised by engagement with the seed in the chambers of the feeding-wheel, a latch adapted to hold the supporting-arm for the star-wheel in an upper position, and a releasing device for the said latch carried by the said master-wheel, for the purpose described.

12. In a potato-planter, a hopper, an elevator-belt adapted to travel partially within and partially without the hopper, buckets carried by the elevator-belt, a casing extending over the upper portion of the elevator-belt in front and at the rear of the same, the front portion of the casing being open and in communication with the interior of the hopper, the rear portion of the casing being closed at the top, the rear and bottom, but provided at its bottom with an opening for the passage of the buckets of the elevator-belt, and provided also adjacent to said opening with an upright partition forming a chamber in the bottom of the rear or covered portion of the casing, and a distributing-chute connected with the said chamber at the bottom of the said casing, as and for the purpose described.

13. In a potato-planter, a hopper, an elevator-belt adapted to travel partially within and partially without the hopper, buckets carried by the elevator-belt, a casing extending over the upper portion of the elevator-belt in front and at the rear of the same, the front portion of the casing being open and in communication with the interior of the hopper, the rear portion of the casing being closed at the top, the rear and the bottom, but provided at its bottom with an opening for the passage of the buckets of the elevator-belt, and provided adjacent to said opening with an upright partition forming a chamber in the bottom of the rear or covered portion of the casing, a distributing-chute connected with the said chamber at the bottom of the said casing, a feeding-wheel provided with chambers, adapted to receive each an individual seed-potato from the said distributing-chute, a reciprocating connection between the said feeding-wheel and the said chute, a drop-bottom for each of the said chambers, a trip device for the drop-bottoms, a spout adapted to receive the seed from the said chambers, and an intermittent driving mechanism for the said feeding-wheel, substantially as described.

14. In a potato-planter, a hopper, an elevator-belt adapted to travel partially within and partially without the hopper, buckets carried by the elevator-belt, a casing extending over the upper portion of the elevator-belt in front and at the rear of the same, the front portion of the casing being open and in communication with the interior of the hopper, the rear portion of the casing being closed at the top, the rear and the bottom, but provided at its bottom with an opening for the passage of the buckets of the elevator-belt, and provided adjacent to said opening with an upright partition forming a chamber in the bottom of the rear or covered portion of the casing, a distributing-chute connected with the said chamber at the bottom of the said casing, a feeding-wheel provided with chambers, adapted to receive each an individual seed-potato from the said distributing-chute, a reciprocating connection between the said feeding-wheel and the said chute, a drop-bottom for each of the said chambers, a trip device for the drop-bottoms, a spout adapted to receive the seed from the said chambers, a star-wheel, a pivotal support therefor, the star-wheel being adapted to be raised by engagement with a seed-potato in a chamber of the feeding-wheel, the said star-wheel being adapted to regulate the driving connection with the said feeding-wheel, and a driving connection between the said elevator-belt and the driving-wheel, whereby when the driving-wheel is operated the conveyer-belt is also operated, as described.

15. In a potato-planter, the combination with a revoluble feed-wheel provided with compartments, and means for operating said wheel, of a fluted wheel, the members of which are adapted to enter the compartments of the feed-wheel, and means connected with the fluted wheel for throwing the feed-wheel-operating means out of action when the fluted wheel engages a potato in the feeding-wheel, as set forth.

16. In a potato-planter, the combination with a revoluble feed-wheel provided with compartments, and means for operating said wheel, of a fluted wheel, the members of which are adapted to enter the compartments of the feed-wheel, mechanism between the fluted wheel and the operating mechanism for throwing said mechanism out of action when the fluted wheel engages a potato in the feed-wheel, and means for holding the fluted wheel out of engagement with the feed-wheel, as set forth.

17. In a potato-planter, the combination with a master-wheel, and means for operating it from the supporting-wheels of the planter, of a revoluble feed-wheel provided with compartments, shiftable gearing for operating the feed-wheel from the master-wheel, a fluted wheel, the members of which are adapted to enter the compartments of the feed-wheel, and a connection between the fluted wheel and the shiftable gearing for throwing it out of gear with the master-wheel when the fluted wheel engages a potato in the feed-wheel, as set forth.

18. In a potato-planter, the combination with a master-wheel, and means for operating it from the supporting-wheels of the planter, of a horizontal revoluble feed-wheel provided with radial compartments, a vertically-movable gear-wheel driven from the master-wheel, a gear-wheel on the shaft of the feed-wheel and with which the said movable gear-wheel meshes, a fluted wheel mounted above the feed-wheel with its members adapted to enter the compartments of said wheel, and a connection between the fluted wheel and the vertically-movable gear for moving it out of gear with the master-wheel when the fluted wheel engages a potato in the feed-wheel, as set forth.

19. In a potato-planter, the combination of a revoluble feed-wheel having compartments, a conducting-tube having a portion extending under the feed-wheel, a hinged bottom for each compartment of the feed-wheel, said bottom when dropped to allow a potato to pass into the projecting portion of the tube, serving to retain the potato in the said tube until it has been raised, and means for closing said bottom, as set forth.

In testimony whereof I have signed my name to this specification in the presence of two subscribing witnesses.

FRANCIS EMERSON SHAW.

Witnesses:
  E. J. COX,
  IRVIN CHASE.